Feb. 6, 1951  R. H. LINBLADE  2,540,340
CARRIER FOR FISHING FLIES
Filed July 5, 1947
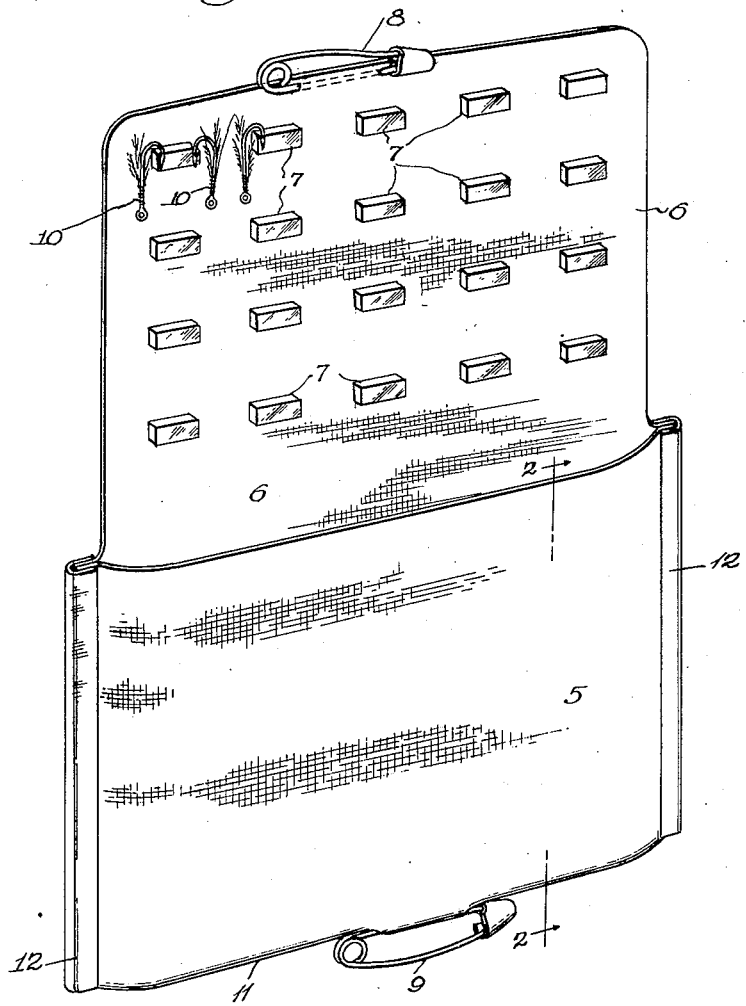
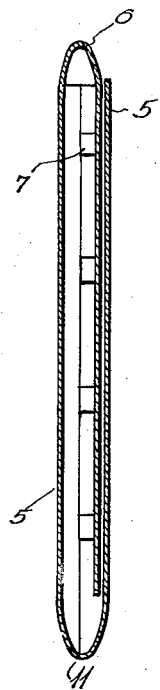
Inventor:
Ralph H Linblade
By: Fred Gerlach
his Atty Patented Feb. 6, 1951

2,540,340

UNITED STATES PATENT OFFICE 2,540,340

CARRIER FOR FISHING FLIES

Ralph H. Linblade, Chicago, Ill., assignor to Floating Laboratories, Inc., Chicago, Ill., a corporation of Illinois Application July 5, 1947, Serial No. 759,203

1 Claim. (Cl. 43—57.5)

The invention relates to carriers for fishing flies provided with hooks.

Heretofore, it has been customary for a fisherman to carry an assortment of flies on a pad of fibrous material, such as lambswool, and to secure the flies to the pad by inserting the points of the hooks into the material of the pad. In the use of these pads, a small tuft of the material or wool in the pad would remain attached to the point of the hook and be removed with the fly, and this plucking would produce spots in the pad which would no longer hold the hooks.

One object of the invention is to provide a carrier for fishing flies provided with hooks, which avoids the necessity of inserting the hook into the material of a pad so that in the removal of the hooks, no portions of the material in the pad or back remain on the hook.

Another object of the invention is to provide a carrier for fishing flies provided with hooks, in which a series of flies will be removably held on magnets secured in spaced relation on a back, for retaining the flies for selective and interchangeable use.

Another object of the invention is to provide a carrier for fishing flies provided with hooks, which is provided with permanent magnets for magnetically holding the hooks and on which the magnets are secured on one face of the flap of a pouch into which the flap, magnets, and flies are insertable when the flies are not being used.

Other objects of the invention will appear from the detailed description.

The invention consists in the several novel features hereinafter set forth, and more particularly defined by a claim at the conclusion hereof.

In the drawings:

Fig. 1 is a perspective of a carrier for fishing flies exemplifying the invention, the flap being withdrawn from the pouch. Fig. 2 is a section taken on line 2—2 of Fig. 1, the flap being shown in the pouch.

The invention is exemplified in a carrier which comprises a pouch 5 which is formed of a waterproofed flexible fabric and with an opening along one edge, and is provided with a flap 6 which is formed of similar fabric and extends from the back side of the pouch and is insertable by folding into the pouch. The pouch 5 is formed of a piece of fabric with a fold 11 which closes the bottom of the pouch and strips 12 lapped around the overlapped side-edges to close the pouch at its sides.

One face of the flap 6 is provided with a series of rows of magnets or permanently magnetized bars 7, which are secured to the flap by a suitable adhesive, or in any other suitable manner, and are spaced apart so that they will independently attract and hold on their end portions, flies with hooks 10, as illustrated in the drawing.

The carrier is adapted to be detachably secured on a garment, such as the vest or coat of the fisherman, by a safety pin 8 which is secured along the free edge of the flap 6. When the carrier is secured to a garment, the flies held by the magnets will be displayed and exposed for selective removal. In fly-fishing, the fisherman frequently desires to interchange the flies to ascertain which will attract the fish. A similar safety pin 9 is secured to the lower edge of the pouch 5, for detachably securing the lower end of the pouch to the garment.

In the use of the carrier, the portions of the steel hooks adjacent the barbs or points, are placed within the magnetic fields of the end portions of the magnets and when so placed, the hooks with the flies thereon, will be magnetically held and displayed for selective removal and use.

A characteristic advantage of the carrier embodying the invention is, that the points of the hooks are kept free from tufts and the hooks can be readily removed for use, and placed on the magnets. The flexible fabric of the flap is not impaired by punctures from the hooks. In the construction illustrated, the flap 6 functions as a flexible back on which the magnets are secured in spaced relation and the safety pin 8 provides means for detachably securing the carrier to a garment of the fisherman.

The invention is not to be understood as limited to the details described, since these may be modified within the scope of the appended claim without departing from the spirit or scope of the invention.

Having thus described the invention, what I claim as new and desire to secure by Letters Patent is:

A carrier for fish-hooks provided with flies, comprising: a pouch of flexible material provided with a pocket open along one margin of the pouch and provided with a flap extending from said open margin, and rows of permanent bar magnets having one of their faces adhesively secured to one face of the flap, projecting from said face with their sides and ends exposed and spaced apart sufficiently to receive the shanks of the hooks between the magnets for magnetically holding the hooks individually, the flap with the magnets thereon and hooks held by the magnets being foldable into the pocket of the pouch.

RALPH H. LINBLADE.

REFERENCES CITED

The following references are of record in the file of this patent:

UNITED STATES PATENTS

| Number | Name | Date |
| --- | --- | --- |
| 361,248 | Winton | Apr. 12, 1887 |
| 811,487 | Davidson | Jan. 30, 1906 |
| 1,623,429 | Martinson | Apr. 5, 1927 |
| 1,993,144 | Kasdan | Mar. 5, 1935 |
| 2,389,299 | Ellis | Nov. 20, 1945 |

FOREIGN PATENTS

| Number | Country | Date |
| --- | --- | --- |
| 294,298 | Great Britain | July 26, 1928 |
| 488,384 | Great Britain | July 6, 1938 |